United States Patent [19]

Tsuchiya et al.

[11] 4,117,193
[45] Sep. 26, 1978

[54] ANTISTATIC, LOW TEMPERATURE HEAT SEALABLE POLYPROPYLENE COMPOSITE FILM AND PROCESS FOR PRODUCTION THEREOF

[75] Inventors: Mikio Tsuchiya, Suita; Takashi Kawamura, Mito; Kaoru Shibata, Tokyo, all of Japan

[73] Assignee: Honshu Seishi Kabushiki Kaisha, Tokyo, Japan

[21] Appl. No.: 787,143

[22] Filed: Apr. 13, 1977

[30] Foreign Application Priority Data

Jul. 22, 1976 [JP] Japan .................................. 51-86566

[51] Int. Cl.$^2$ ...................... B32B 7/02; B32B 27/08; B32B 27/16; B32B 27/32
[52] U.S. Cl. ................................... 428/339; 156/164; 156/229; 156/244.17; 156/272; 428/474; 428/516; 428/523; 428/539; 428/910
[58] Field of Search ................ 428/332, 339, 474, 515, 428/516, 523, 539, 910; 156/163, 164, 229, 244, 272, 244.11, 244.17

[56] References Cited

U.S. PATENT DOCUMENTS

| | | | |
|---|---|---|---|
| 2,594,229 | 4/1952 | Snyder et al. | 428/220 |
| 2,833,671 | 6/1958 | Funk et al. | 428/474 X |
| 3,397,101 | 8/1968 | Rausing | 428/515 X |
| 3,496,061 | 2/1970 | Freshour et al. | 428/516 X |
| 3,501,363 | 3/1970 | Kirkpatrick | 428/332 X |
| 3,697,368 | 10/1972 | Bhuta et al. | 428/474 |
| 3,788,923 | 1/1974 | Soliman | 156/244 |
| 3,840,427 | 10/1974 | Brazier et al. | 428/474 |
| 3,870,593 | 3/1975 | Elton et al. | 428/339 X |
| 3,912,843 | 10/1975 | Brazier | 428/474 |
| 4,048,428 | 9/1977 | Baird et al. | 428/515 X |

*Primary Examiner*—Harold Ansher
*Attorney, Agent, or Firm*—Flynn and Frishauf

[57] ABSTRACT

There is disclosed a novel composite film prepared by melt extrusion laminating a polymer blend composition comprising a low-crystalline resin of an ethylene-butene copolymer and a polyolefin resin having incorporated therein a lubricant and an anti-blocking agent onto a surface or surfaces of a uniaxially stretched polypropylene film followed by stretching the laminate film in the direction perpendicular to the direction in which said polypropylene has been stretched and optionally subjecting the resulting film to corona discharge treatment. The composite film thus made provides an excellent packaging material because of its improved antistatic, lubricating and anti-blocking properties in addition to its heat sealability feasible at lower temperatures than prior art materials.

27 Claims, 2 Drawing Figures

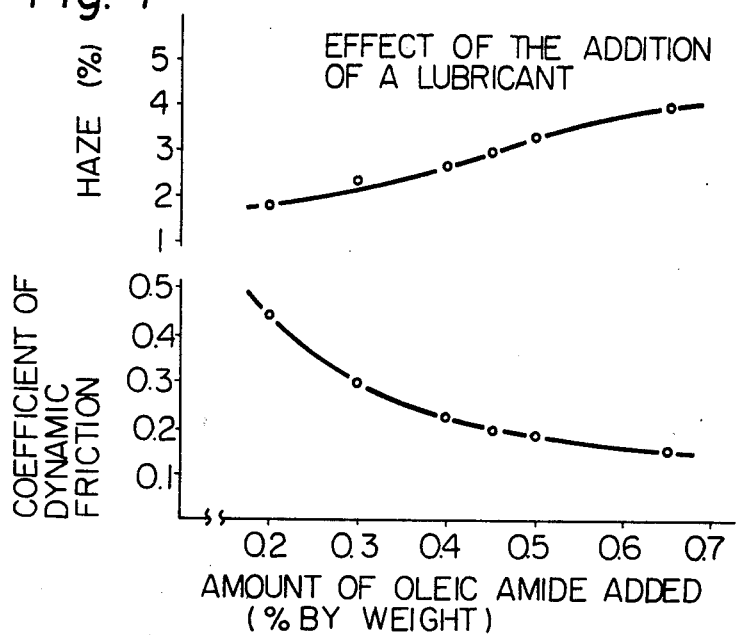
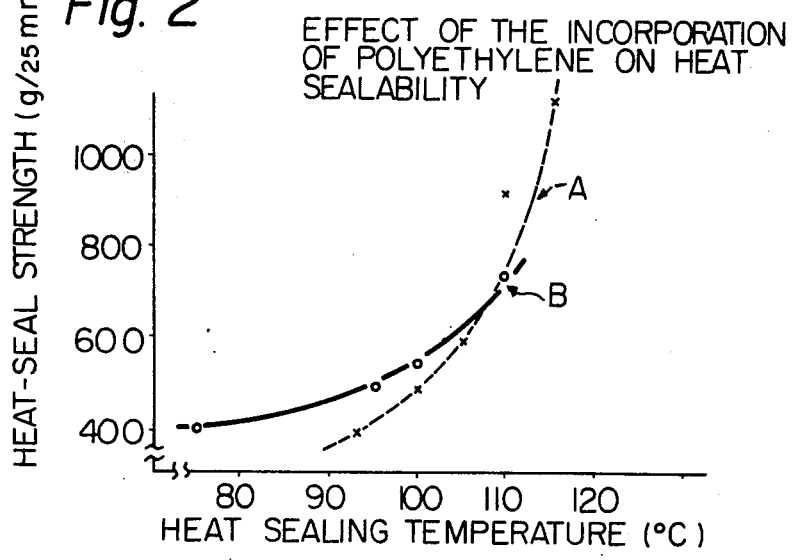

ANTISTATIC, LOW TEMPERATURE HEAT SEALABLE POLYPROPYLENE COMPOSITE FILM AND PROCESS FOR PRODUCTION THEREOF

This invention relates to an anti-static, self-lubricating and low-temperature heat sealable polypropylene composite film and a process of preparing the same.

It is common knowledge that crystalline polypropylene biaxially oriented film has numerous uses as a packaging material, particularly as a food packaging material because of its various exceptional properties including excellent optical properties such as transparency, brilliance, etc.; excellent mechanical properties such as tensile strength, Young's modulus, etc.; very small vapor-permeability; non-toxicity and non-odorous properties; and the like. However, it has a defect in that the single substance film thereof has rather poor heat sealability, and even if it is heated to a temperature at which heat sealing is feasible, satisfactory sealing strength cannot be obtained, and in addition, it is easy to produce buckling due to heat shrinkage which spoils the beauty of the sealed surface and reduce the value of film as a commercial article.

To overcome such defects, a number of attempts for improvement have been tried hitherto. Representative examples of such attempts include (1) a process which comprises preparing a solution or an emulsion from an easily heat sealable resin and then applying the resulting solution or emulsion to one or both surfaces of the biaxially oriented polypropylene film; (2) dry lamination which comprises coating an adhesive on one or both surfaces of the biaxially oriented polypropylene film and then laminating thereon an easily heat sealed resin film or films; (3) a process using no adhesive which comprises melt extrusion laminating at a high temperature easily heat sealed resin onto one or both surfaces of the biaxially oriented film; and the like.

The process (1) mentioned above has defects in that a number of processing steps such as a coating step, a drying step and a solvent-recovering step are required, and in addition, since these steps cannot be carried out in a continuous process, cost of the product increases. Also, sealing strength is at most in the region of 200-300 g/25 mm, which is satisfactory only for simple packaging.

The process (2) mentioned above also requires a separate step for applying adhesives to the polymer film, and therefore is not free from the defect that cost of the product increases.

The process (3) mentioned above does not require the steps of applying solvent or adhesives, but this process must also be carried out separately from the process of making the polymer film. Also, it is extremely difficult from a technical viewpoint to privide a very thin laminate coating such as in the region of $10\mu$ or so by this high temperature melt extrusion coating process.

As a result of many studies which have been made to eliminate these defects of the prior art processes, we have accomplished the invention of a composite film which has excellent anti-static properties, excellent lubricating properties and low-temperature heat sealability. This composite film of the present invention has additional advantages in that cost of the product is decreased and the film can be used in such processes as high-speed, automatic bag making or high-speed, automatic packaging process.

The composite film of the present invention is prepared by melt extrusion laminating a polymer blend composition comprising (a) a polymer blend of a low-crystalline resin of an ethylene-butene copolymer and a polyolefin resin; and (b) additives; a lubricant and an anti-blocking agent; onto at least one surface of a uniaxially stretched polypropylene film prepared by uniaxially stretching a polymer composition comprising (a) a propylene homopolymer or a propylene copolymer containing a small amount of α-olefin and (b) additives; a lubricant, an anti-blocking agent and an antistatic agent; and then stretching the resulting laminate film in the direction perpendicular to the direction in which said polypropylene film has been stretched. The biaxially oriented film thus prepared is preferably subjected to corona discharge treatment to further improve the properties of the composite film. The polypropylene from which said uniaxially stretched film substrate layer is prepared may include a propylene homopolymer and a propylene copolymer containing up to 5% by weight of ethylene. The polyolefin resin as one component of the polymer blend mentioned above is preferably a high density polyethylene (namely, low-pressure-processed or moderate-pressure-processed polyethylene). The ethylene-butene copolymer as another component of the polymer blend mentioned above can be a copolymer comprising 50-99% by weight of ethylene and, correspondingly, 50-1% by weight of butene. More preferably, this ethylene-butene copolymer comprises 90-99% by weight of ethylene and, correspondingly, 10-1% by weight of butene. The polymer blend which can be used as a laminating resin in the practice of the present invention can comprise 20-60% by weight of said ethylene-butene copolymer and, correspondingly, 80-40% by weight of said polyethylene. More preferably, the polymer blend comprises 25-45% by weight of the same ethylene-butene compolymer and, correspondingly, 75-55% by weight of the same polyethylene. The composite film of the present invention generally has a thickness in the region of 10-60 microns, more preferably, in the region of 15-50 microns, and most preferably, in the region of 20-30 microns.

In the following description, the processes through which the present invention has been accomplished will be explained.

We have found that biaxially stretched polypropylene composite film which is prepared by applying a low-crystalline ethylene-butene copolymer to one or both surfaces of a crystalline polypropylene uniaxially stretched film containing an anti-static agent, a lubricant and an anti-blocking agent by a melt extrusion laminating method, namely without any pre-treatment such as the application of adhesives, and then stretching the resulting laminate film in the direction perpendicular to that in which said substrate film has been stretched, and finally subjecting at least one surface of said laminate film to corona discharge treatment is one having a lamination layer $3\mu$ thick and exhibits a heat seal strength at least in the region of 600-800 g/25 mm (at 110° C.), anti-static properties, in terms of "ratio of electrostatic decay", in the region of 80-100% and surface resistivity in the region of $10^{10}$-$10^{11}$ cm.

However, though this ethylene-butene copolymer resin composite film is excellent in its transparency and low-temperature heat sealability, it has a defect in that since an ethylene-butene copolymer resin has properties intermediate between rubber and plastic, the film made of it is poor in its lubricating properties and anti-blocking properties.

We have also found that by blending in said ethylene-butene copolymer resin a polyolefin-type thermoplastic resin, particularly a high density polyethylene (or a moderate- or low-pressure-processed polyethylene resin) having compatibility therewith, the above-mentioned defects of the ethylene-butene copolymer resin can be eliminated, and in addition, the essential properties of said resin can be promoted.

The attempt to improve lubricating and anti-blocking properties of an ethylene-butene copolymer resin by simply incorporating therein, as a lubricating agent, 0.2–1.0% by weight of a conventional higher fatty acid amide (such as, for example, oleic amide, stearic amide, erucic amide and the like) and, as an anti-blocking agent, 0.1–0.5% by weight of silica will be successful to a certain level, because the added amide bleeds to the surface of the low-crystallinity ethylene-butene copolymer resin layer and thereby the lubricating properties of said resin are improved and at the same time the anti-blocking properties, at least, of the same resin are substantially improved. However, said attempt will not completely avoid the blocking of a rolled film immediately after the formation thereof. Increasing the amounts of these lubricating and anti-blocking agents generally leads to spoiling the appearance, which decreases the value of the product as an article.

Hereupon, we have tried to blend with said ethylene-butene copolymer resin an olefin type resin, particularly a high density polyethylene (namely, a moderate- or low-pressure polyethylene) which originally has good lubricating and anti-blocking properties and has good compatibility with the ethylene-butene copolymer resin. It has been found that when 40–80% by weight, preferably 55–75% by weight based on the total amount of blending components, of said olefin type resin is blended, the lubricating and anti-blocking properties of the ethylene-butene copolymer resin are substantially improved and the blocking in the roll film can also be avoided. It has also been found that if an ordinary lubricating agent (such as amides of higher fatty acids) in an amount of 0.1–1.0% by weight, and an anti-blocking agent (such as silica) in an amount of 0.05–0.2% by weight are additionally incorporated, extremely good lubricating and anti-blocking properties can be obtained. Further, it has also been found that blending a polyolefin-type resin, preferably high density (or moderate- or low-pressure) polyethylene into the ethylene-butene copolymer resin not only eliminates the above-mentioned defects of the latter resin but also positively improves the desirable properties which the same resin originally possesses. That is, the following additional advantages are observed.

An ethylene-butene copolymer resin is generally heat sealable at a low temperature of 110° C. and heat seal strength at that temperature is in the region of 500–600 g/25 mm. In contrast, if polyethylene, preferably high density (or moderate- or low-temperature) polyethylene (for example, of 0.94 g/cm³ density) is blended therein, the modified resin shows a heat seal strength of 800 g/25 mm or higher and in addition, as a result of the hardness of resin being improved both scratch resistance and stiffness as a composite film are improved.

The improved anti-static properties can be obtained in accordance with the present invention by incorporating 0.2–1.0% by weight of an ordinary anti-static agent only in the substrate polypropylene film layer and then subjecting at least one surface of the stretched composite film to corona discharge treatment to obtain a surface tension of 35 dynes/cm or greater, preferably in the region of 35–45 dynes/cm, most preferably in the region of 37–40 dynes/cm.

In this type of composite film, an anti-static agent is generally incorporated in a lamination layer and no antistatic agent is incorporated in a substrate layer. Accordingly, it is surprising to find that both antistatic and anti-blocking properties of such a composite can be improved substantially by incorporating an antistatic agent in a substrate layer, omitting to incorporate it in a lamination layer, in accordance with the present invention.

In the following lines, the results of investigations with respect to the technical requirements in the practice of the present invention will be explained.

Effect of The Amount of a Lubricating Agent to be Incorporated in a Laminating Resin An isotactic polypropylene resin (MFI=2.0) having incorporated therein 0.1% by weight of a lubricating agent (stearic amide), 0.5% by weight of an anti-blocking agent (silica) and 0.4% by weight of an antistatic agent (N,N-bis(2-hydroxyethyl) alkoxypropylbetaine) was prepared to be used as a substrate layer, and it was uniaxially stretched by five times to obtain a uniaxially stretched film 235μ thick by using the sequential biaxially stretching apparatus. To a blend comprising 30 parts by weight of an ethylene-butene copolymer resin and 70 parts by weight of a high-pressure (namely, low density) polyethylene were added 0.15% by weight of an anti-blocking agent (silica) and six different levels, varying from 0.2 to 0.65% by weight, of a lubricating agent (oleic amide) followed by extrusion melt blending these components to obtain pellets of laminating resin. Then, the laminating resin was applied onto one surface of said uniaxially stretched film (substrate layer) to provide thereon a lamination layer 35μ thick. Then, the resulting composite film was stretched in the direction perpendicular to that in which said uniaxially-stretched film had been stretched by nine times to finally obtain the composite film 30μ thick. The non-laminated side surface of the composite film was subjected to corona discharge treatment to the degree of 40 dyns/cm.

The properties of the resulting composite film are as shown in Table 1 below. The table shows that as the percent addition of lubricant increases, the haze increases, while the coefficient of dynamic friction decreases. These results can be illustrated by a diagram as shown in FIG. 1.

The results of Table 1 show that any amount in the region of 0.2–0.65% by weight is effective to the advantage of the present invention, so long as it concerns the addition of a lubricant. In the practice of the present invention, the amount of addition can be in the region of 0.1–1.0%. From the viewpoint of both lubricating properties and transparency, the preferred amount of addition is in the region of 0.2–0.5% by weight.

Table 1

| Lubricating Agent added (% by weight) | Haze (%) | (4) Coefficient of dynamic friction | (2) Ratio of Electrostatic decay (%) | (3) Anti-blocking Properties (Class) | Heat Seal Strength (g/25mm) |
|---|---|---|---|---|---|
| 0.2 | 1.8 | 0.45 | 100 | 1–2 | 700 |
| 0.3 | 2.3 | 0.30 | 100 | 1–2 | 700 |
| 0.4 | 2.7 | 0.23 | 90 | 1 | 700 |

Table 1-continued

| Lubricating Agent added (% by weight) | Haze (%) | (4) Coefficient of dynamic friction | (2) Ratio of Electrostatic decay (%) | (3) Antiblocking Properties (Class) | Heat Seal Strength (g/25mm) |
|---|---|---|---|---|---|
| 0.45 | 3.1 | 0.20 | 85 | 1 | 700 |
| 0.5 | 3.3 | 0.19 | 80 | 1 | 700 |
| 0.65 | 4.0 | 0.17 | 80 | 1 | 700 |

Notes:
(1) Laminated surface × non-laminated surface
(2) Non-laminated surface
(3) Laminated surface × non-laminated surface

Effect of Change in Ratio of the Thickness of the Uniaxially Stretched Film (Substrate Film) to the Thickness of the Lamination Layer The ratio of the thickness of a substrate layer to that of a lamination layer was varied to determine how the properties of the composite film change with a change in their relative thickness.

Using a method similar to that described in the previous item in which the effect of the amount of a lubricating agent was examined, 0.5% by weight of a lubricating agent (stearic amide) and 0.15% by weight of an anti-blocking agent (silica) were incorporated in a combination of 40 parts by weight of ethylene-butene copolymer resin and 60 parts by weight of high-pressure polyethylene and they were blended by a melt extrusion process into pellets which would be used as a laminating resin. The same additives as mentioned above were incorporated in the isotactic polypropylene resin mentioned above and the resulting resin was stretched to five times its original length to a thickness within the range of 200–260μ to provide uniaxially stretched films (of 4 different thicknesses) which would be used as a substrate layer. Then, the laminating resin was applied onto one surface each of said substrate layers to provide there a lamination layer in the region of 72–18μ (4 levels) thick. Then, each of the composite films was stretched to nine times its original length in the direction perpendicular to that in which the substrate layer had been stretched in order to form the final composite film 30μ thick. Then, corona discharge treatment was applied to the non-laminated side surface of each of said composite films to eventually provide a surface tension of 40 dynes/cm. The properties of the resulting composite film are as shown in Table 2.

When the thickness of the four laminated resin layers is within the range of 72–18μ (correspondingly within the range of 8–2μ after stretching), it was observed that as the thickness of the laminated layer increases, the ratio of electrostatic decay tends to decrease, and the heat seal strength increases, while the other factors show almost no substantial changes. Based on these results, one can determine the most desirable thickness of lamination for each purpose, taking the haze, the ratio of electrostatic decay, the heat seal strength, etc. into consideration.

Table 2

| Thickness: substrate layer/laminated layer (μ/μ) | Haze (%) | Coefficient of dynamic friction (1) | Ratio of electrostatic decay (%) (2) | Anti-blocking properties (Class) (3) | Heat seal strength (110° C) (4) |
|---|---|---|---|---|---|
| 28/2 | 2.0 | 0.2–0.3 | 100 | 1–2 | 600 |
| 26/4 | 2.3 | 0.2–0.3 | 95 | 1–2 | 700 |
| 24/6 | 2.5 | 0.2–0.3 | 80 | 1–2 | 800 |
| 22/8 | 2.5 | 0.2–0.3 | 80 | 1–2 | (5) greater than 800 |

Notes:
(1) Laminated surface × non-laminated surface
(2) Non-laminated surface
(3) Laminated surface × non-laminated surface
(4) Laminated surface × non-laminated surface
(5) Peeling could not be finished before the rupture of one of the test pieces of film

BRIEF EXPLANATION OF THE DRAWINGS

FIG. 1 shows the effect of the addition of a lubricating agent to a laminating resin;

FIG. 2 shows the effect of the incorporation of polyethylene in accordance with the present invention on the heat sealing suitability of the film.

A ... laminated composite film comprising ethylene-butene copolymer (40 parts) and moderate- or low-pressure polyethylene (60 parts)

B ... composite film laminated with ethylene-butene copolymer resin.

The following comparative and working examples will explain the present invention further. In these examples, the measurements were obtained by the following methods.

(1) Haze

The haze was determined by the methods defined in JIS K-6714 and K-6718 using a haze meter available from NIHON DENSHOKU KOGYO CO., LTD.

(2) Lubricating properties (Coefficients of static- and dynamic frictions)

It was determined by the method defined in ASTM D-1894 (B-method) using TENSILON available from TOYO SEIKI CO., LTD.

(3) Anti-static properties

Ratio of electrostatic decay (%): The film was left for 24 hours in an atmosphere having a temperature of 20° C. and 65% RH. After that, it was charged at 6 KV for 1 minute using a "Static Honestmeter" made by SHI-SHIDO SHOKAI CO., LTD., and then discharged for 30 seconds before said ratio was determined.

Surface resistivity (Ω cm)

The film was left for 24 hours in an atmosphere having 20° C. and 65% RH. Then, the surface resistivity thereof was measured by the "Super Insulation Tester" "SM-10" of TOA DEMPA CO., LTD. make.

(4) Heat seal strength

Onto the contacting surfaces to be heat sealed with each other, each 25 mm wide, was applied pressure of 2 Kg/cm² for 1 second by a "Multi-temperature Level Heat Sealer" available from TOYO SEIKI CO., LTD. and the resulting heat-sealed surfaces were left for 24 hours in an atmosphere having 20° C. and 65% RH. After that, the strength of force required for peeling was measured at a rate of 300 mm/min with a "TENSILON" of TOYO SEIKI CO., LTD. make.

film was subjected to corona discharge treatment to the degree of 40 dynes/cm.

The properties of the composite film thus obtained are as shown in Table 3 and Table 4 below.

Table 3

| | Item | | | Comparative Example | Example 1 | Example 2 | Example 3 | Example 4 |
|---|---|---|---|---|---|---|---|---|
| substrate layer | isotactic polypropylene | | (parts) | 100 | 100 | 100 | 100 | 100 |
| | lubricating agent | stearic amide | (%) | 0.1 | 0.1 | 0.1 | 0.1 | 0.1 |
| | anti-blocking agent | silica | (%) | 0.5 | 0.5 | 0.5 | 0.5 | 0.5 |
| | anti-static agent | | (%) | 0.4 | 0.4 | 0.4 | 0.4 | 0.4 |
| laminating resin | ethylene-butene copolymer resin | | (parts) | 100 | 40 | 30 | 40 | 40 |
| | low-density polyethylene | | (parts) | | 60 | 70 | 60 | |
| | high-density polyethylene | | (parts) | | | | | 60 |
| | lubricating agent | oleic amide | (%) | 0.4 | 0.4 | 0.4 | | 0.4 |
| | | stearic amide | (%) | | | | 0.5 | |
| | anti-blocking agent | silica | (%) | 0.15 | 0.15 | 0.15 | 0.15 | 0.15 |
| laminate | laminated surface | | | one surface | one surface | one surface | both surfaces each 15 | both surfaces each 15 |
| | thickness of lamination layer(s) | | (μ) | 35 | 35 | 35 | 9 | 9 |
| stretching | multiplication of stretching | | (times) | 9 | 9 | 9 | 9 | 9 |
| | final thickness of film | | (μ) | 30 | 30 | 30 | 20 | 20 |
| corona discharge treatment | wet surface tension | | (dyns/cm) | 40 | 40 | 40 | 37 | 37 |

Table 4

| | Item | | Comparative Example | Example 1 | Example 2 | Example 3 | Example 4 |
|---|---|---|---|---|---|---|---|
| properties | Haze | (%) | 1.8 | 2.2 | 2.7 | 3.0–3.5 | 2.0–3.0 |
| | (1) coefficient of dynamic friction | | 0.7–0.8 | 0.2–0.3 | 0.23 | 0.2–0.3 | 0.3–0.4 |
| | ratio of electrostatic decay (%) | non-treated surface | 100 | 100 | 90 | 80–100 | 80–100 |
| | | treated surface | 0–5 | 0–5 | 0–5 | 20–30 | 20–30 |
| | surface resistivity (Ωcm) | × surface | $10^{10}$–$10^{11}$ | $10^{10}$–$10^{11}$ | $10^{10}$–$10^{11}$ | $10^{10}$–$10^{11}$ | $10^{10}$–$10^{11}$ |
| | | treated surface | $10^{13}$–$10^{14}$ | $10^{13}$–$10^{14}$ | $10^{13}$–$10^{14}$ | $10^{12}$–$10^{13}$ | $10^{12}$–$10^{13}$ |
| | (2) anti-blocking properties | (class) | 3–4 | 1–2 | 1 | 1–2 | 1–2 |
| | heat-seal strength (g/25 mm) | | 700 | 650 | 700 | 400–600 | 600–800 |

Notes: In case of one-side lamination
(1) laminated surface x non-laminated surface
(2) laminated surface × non-laminated surface   In case of two-side lamination
(1) treated surface × non-treated surface
(2) treated surface × non-treated surface (5) Anti-blocking properties Test pieces of film each 50 mm × 50 mm in size were prepared by random sampling and two of them were placed in contact with each other in such a way that the surfaces to be examined were face to face. The two strips of film were left in an atmosphere of 40° C. and 90% RH for 24 hours under applied pressure of 2 Kgs. After that, the two strips of film were examined and evaluated in terms of the degree of blocking observed, the ranking ranging from Class 1 (no blocking) to Class 5 (complete blocking).

Comparative Example

An isotactic polypropylene resin (MF I = 2.0) having incorporated therein 0.1% by weight of a lubricating agent (stearic amide), 0.5% by weight of an anti-blocking agent (silica) and 0.5% by weight of an anti-static agent was stretched to five times its original length by using the sequential biaxially stretching apparatus to obtain a uniaxially stretched film 235μ thick. To 100 parts of ethylene-butene copolymer resin were added 0.4% by weight of lubricating agent (oleic amide) and 0.15% by weight of an anti-blocking agent (silica) to obtain a laminating resin. Then, the laminating resin was applied onto one surface of said uniaxially stretched film to provide thereon a lamination layer 35μ thick. Then, the resulting composite film was stretched to nine times its original length in the direction perpendicular to that in which said uniaxially stretched film had been stretched to finally obtain a composite film 30μ thick. The non-laminated surface of said composite

EXAMPLE 1

A composite film 30μ thick was prepared in the same manner as in the Comparative Example by applying the same laminating resin as used in said Comparative Example except that instead of 100 parts of the ethylene-butene copolymer resin a blend consisting of 40 parts by weight of the same copolymer resin and 60 parts by weight of high-pressure polyethylene was applied to one surface of the uniaxially stretched film prepared in the same manner as in the same Comparative Example.

Properties of the composite film thus obtained are given in Table 3 and Table 4 together with the conditions under which the composite film was prepared.

EXAMPLE 2

Onto one surface of the uniaxially stretched film prepared entirely in the same manner as in the Comparative Example was applied the same laminating resin as used in the Comparative Example except that instead of 100 parts by weight of the ethylene-butene copolymer a blend consisting of 30 parts by weight of the same copolymer resin and 70 parts by weight of high-pressure polyethylene were used, said laminating resin having incorporated therein the same additives as in the above-mentioned Comparative Example. Thus, the composite film 30μ thick was prepared in the same manner.

Properties of the composite film thus obtained are given in Table 3 and Table 4 together with the conditions under which it was prepared.

EXAMPLE 3

Onto both surfaces of a uniaxially stretched film 150μ thick prepared in the same manner as in the Comparative Example was applied a laminating resin comprising 40 parts of ethylene-butene copolymer and 60 parts of high-pressure (low density) polyethylene and having incorporated therein as additives 0.5% by weight of a lubricating agent (stearic amide) and 0.15% by weight of an anti-blocking agent to the thickness of 15μ, respectively, for both sides, and further according to the same manner as in the Comparative Example the composite film finally 20μ thick was prepared. One of said surfaces was subjected to corona discharge treatment to the degree of 37 dynes/cm.

The results are as shown in Table 3 and Table 4.

EXAMPLE 4

Onto a uniaxially stretched film 150μ thick prepared in the same manner as in the Comparative Example was applied a laminating resin comprising a blend of 40 parts of ethylene-butene copolymer resin, and 60 parts of high density (moderate- or low-pressure) polyethylene having incorporated therein 0.5% by weight of a lubricating agent (oleic amide) and 0.15% by weight of an anti-blocking agent (silica) in the same manner as in Example 3 to finally obtain a composite film 20μ thick. Corona discharge treatment was applied thereto in the same manner as in Example 3.

Preparation conditions and properties of the resulting cpmposite film are as given in Table 3 and Table 4.

As is obvious from Table 3 and Table 4, improvement in "coefficient of dynamic friction" (lubricating properties) and anti-blocking properties are observed with respect to Examples 1 and 2 as compared with the Comparative Example (one-surface lamination). Results of two-surface lamination of the Comparative Example are not shown in said tables. No substantial anti-blocking properties were observed. It is difficult to make articles therefrom. If polyethylene is blended in the ethylene-butene copolymer resin as in Examples 3 and 4, the production of an improved composite film having substantial anti-blocking properties and satisfactory low-temperature heat seal strength is ensured.

Comparison of heat seal suitability of the composite film of the present invention obtained in Example 5 and the composite film obtained in the Comparative Example is shown in FIG. 2. What is evident on comparing the two curves is that one which represents the heat seal strength of the composite film of Example 4 has a steeper slope rising.

By using the film prepared in accordance with the present invention and the automatic packaging machine (Type W-37 available from TOKYO JIDO KIKAI CO., LTD.), a packaging test for applying said film to marketing packs of cigarettes was carried out at a packaging rate of 150 packs/minute. Satisfactory packaging suitability of the film was proved. Heat sealing was feasible at a temperature 10°-15° C. lower as compared with the case in which ordinary moisture-proof cellophane was used, with the heat seal strength being excellent.

What we claim is:

1. An antistatic, low-temperature heat-sealable polypropylene composite film which comprises:
   (a) a substrate layer of a uniaxially stretched film of a polymer composition comprising a propylene homopolymer or a propylene copolymer containing a small amount of an alpha-olefin, said polymer composition having incorporated therein (i) a lubricant, (ii) an anti-blocking agent, and (iii) an antistatic agent; and
   (b) a lamination layer or layers of a polymer blend composition comprising a low-crystalline resin of an ethylene-butene copolymer and a polyolefin resin laminated on at least one surface of said substrate layer, said polymer blend composition having incorporated therein (i) a lubricant and (ii) an anti-blocking agent, said composite film having been stretched, after lamination, in a direction perpendicular to the direction in which said substrate layer has been stretched.

2. The composite film of claim 1 which has been subjected to corona discharge treatment after the final stretching.

3. The composite film of claim 2 in which the corona discharge treatment has been carried out until the surface tension of the treated surface reaches 35-45 dynes/cm.

4. The composite film of claim 2 in which the corona discharge treatment has been carried out until the surface tension of the treated surface reaches 37-40 dynes/cm.

5. The composite film of claim 1 in which said polypropylene in the uniaxially stretched film substrate layer is selected from the group consisting of a propylene homopolymer and a propylene copolymer containing up to 5% by weight of ethylene.

6. The composite film of claim 1 in which said polyolefin resin in the polymer blend in the lamination layer is a high density polyethylene.

7. The composite film of claim 1 in which said ethylene-butene copolymer in the polymer blend in the lamination layer is a copolymer comprising 50-99% by weight of ethylene and 50-1% by weight of butene.

8. The composite film of claim 1 in which said ethylene-butene copolymer in the polymer blend in the lamination layer is a copolymer comprising 90-99% by weight of ethylene and 10-1% by weight of butene.

9. The composite film of claim 1 in which said polymer blend in the lamination layer comprises 20-60% by weight of the ethylene-butene copolymer and 80-40% by weight of the polyethylene.

10. The composite film of claim 1 in which said polymer blend in the lamination layer comprises 25-45% by weight of the ethylene-butene copolymer and 75-55% by weight of the polyethylene.

11. The composite film of claim 1 having a thickness in the region of 10-60 microns.

12. The composite film of claim 1 having a thickness in the region of 15-50 microns.

13. The composite film of claim 1 having a thickness in the region of 20-30 microns.

14. A process for the production of an antistatic, low-temperature heat-sealable polypropylene composite film which comprises the steps of:

melt extrusion laminating a polymer blend composition comprising (a) a polymer blend of (i) a low-crystalline resin of an ethylene-butene copolymer and (ii) a polyolefin resin; and (b) additives: (i) a lubricant and (ii) an anti-blocking agent; onto at least one surface of a uniaxially stretched polypropylene film prepared by uniaxially stretching a polymer composition comprising (a) a propylene homopolymer or a propylene copolymer containing a small amount of an alpha-olefin and (b) additives: (i) a lubricant, (ii) an anti-blocking agent and (iii) an antistatic agent; and then stretching the resulting laminate film in the direction perpendicular to the direction in which said polypropylene film has been stretched.

15. The process of claim 14 which includes an additional step of subjecting the biaxially stretched film to corona discharge treatment.

16. The process of claim 15 in which the corona discharge treatment is carried out until the surface tension of the treated surface reaches 35–45 dynes/cm.

17. The process of claim 15 in which the corona discharge treatment is carried out until the surface tension of the treated surface reaches 37–40 dynes/cm.

18. The process of claim 14 in which said polypropylene in the uniaxially stretched film substrate layer is selected from the group consisting of a propylene homopolymer and a propylene copolymer containing up to 5% by weight of ethylene.

19. The process of claim 14 in which said polyolefin resin in the polymer blend in the lamination layer is a high density polyethylene.

20. The process of claim 14 in which said ethylene-butene copolymer in the polymer blend in the lamination layer is a copolymer comprising 50–99% by weight of ethylene and 50–1% by weight of butene.

21. The process of claim 14 in which said ethylene-butene copolymer in the polymer blend in the lamination layer is a copolymer comprising 90–99% by weight of ethylene and 10–1% by weight of butene.

22. The process of claim 14 in which said polymer blend in the lamination layer comprises 20–60% by weight of the ethylene-butene copolymer and 80–40% by weight of the polyethylene.

23. The process of claim 14 in which said polymer blend in the lamination layer comprises 25–45% by weight of the polyethylene.

24. The composite film of claim 1, wherein the lubricant is a fatty acid amide in an amount of from 0.2 to 1 percent by weight.

25. The composite film of claim 1, wherein the anti-blocking agent is silica in an amount of from 0.1–0.5 percent by weight.

26. The process of claim 14, wherein the lubricant is a fatty acid amide in an amount of from 0.2 to 1 percent by weight.

27. The process of clam 14, wherein the anti-blocking agent is silica in an amount of from 0.1–0.5 percent by weight.

* * * * *